June 12, 1951 J. MIHALYI 2,556,431

PHOTOELECTRIC EXPOSURE METER

Original Filed March 14, 1946 2 Sheets-Sheet 1

JOSEPH MIHALYI
INVENTOR

BY Newton M. Perrins,
ATTORNEYS

June 12, 1951          J. MIHALYI          2,556,431
PHOTOELECTRIC EXPOSURE METER
Original Filed March 14, 1946          2 Sheets-Sheet 2
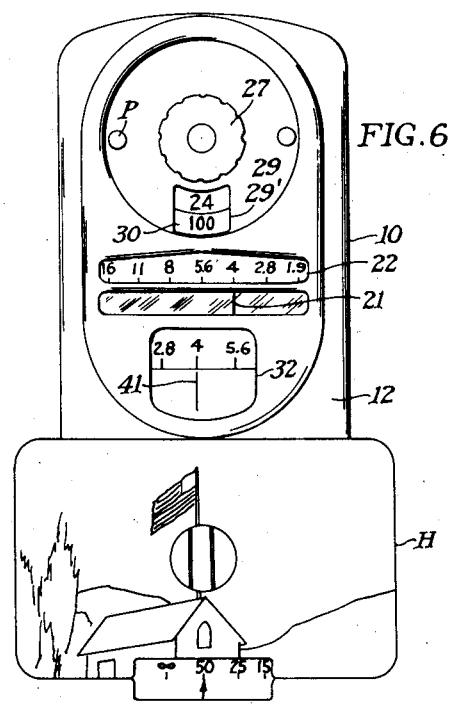
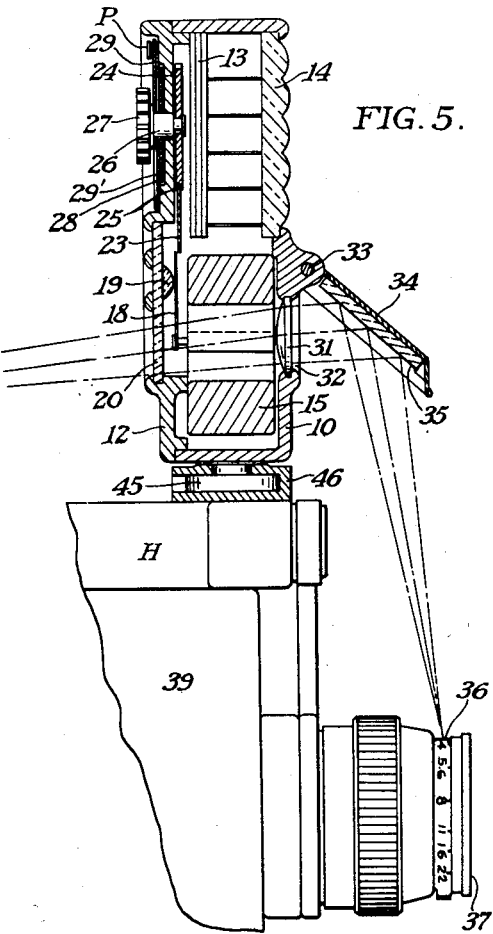
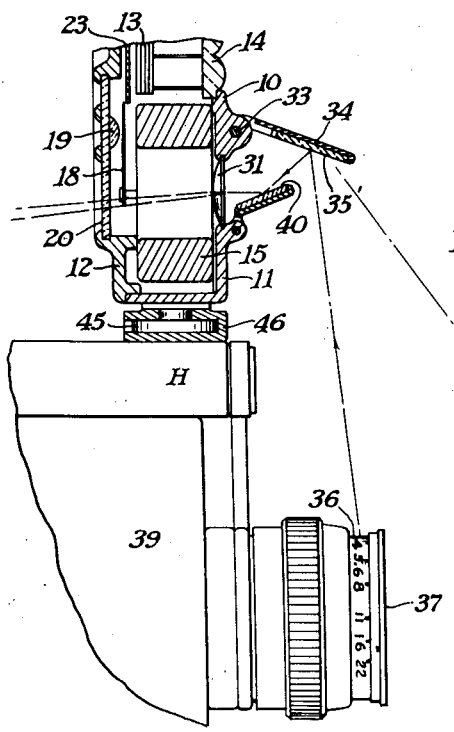
JOSEPH MIHALYI
INVENTOR
BY
ATTORNEYS Patented June 12, 1951

2,556,431

UNITED STATES PATENT OFFICE 2,556,431

PHOTOELECTRIC EXPOSURE METER

Joseph Mihalyi, Rochester, N. Y., assignor to Eastman Kodak Company, Rochester, N. Y., a corporation of New Jersey Original application March 14, 1946, Serial No. 654,327, now Patent No. 2,481,678 dated September 13, 1949. Divided and this application October 1, 1947, Serial No. 777,153

1 Claim. (Cl. 88—23)

The present invention relates to an exposure meter for use in photography which is particularly designed so that it can be combined with a camera to permit viewing of an image, such as a diaphragm scale of a lens mount.

This application is a division of my copending application Serial Number 654,327, filed March 14, 1946, now Patent No. 2,481,678, patented September 13, 1949.

The primary object of the present invention is the provision of an exposure meter comprising a specific type of casing and galvanometer structure, along with an associated optical system, all arranged to permit viewing of an image, such as a diaphragm scale of a lens mount, along with the scale of the meter in adjacent relationship from a common viewpoint.

Another object of the present invention is to provide a photoelectric exposure meter which can be mounted on the front of a camera and having a mirror system which is adapted to throw the image of the camera diaphragm scale adjacent the scale on the meter which is marked in $f$-values so that the two can be simultaneously viewed from the viewpoint of the camera view finder system.

Figure 2:
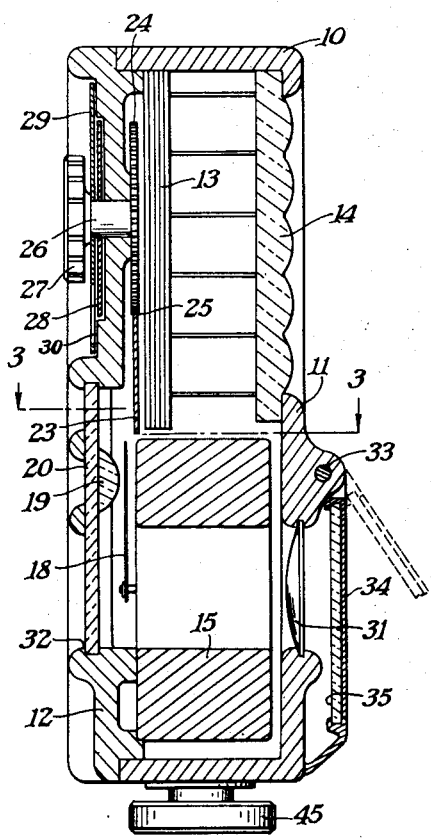
Figure 1:
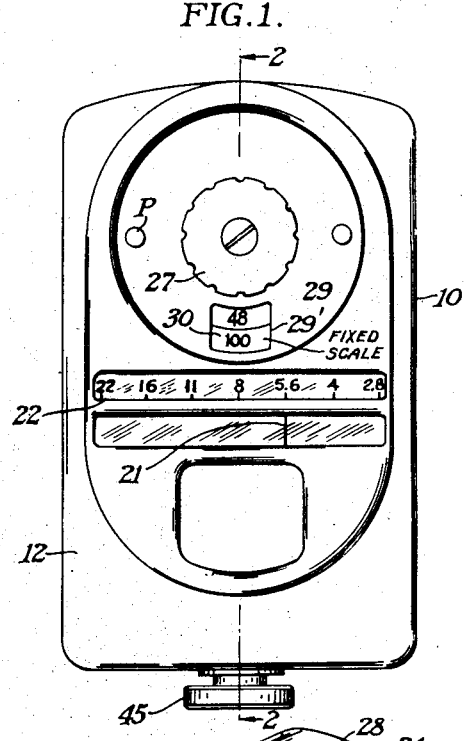
Figure 4:
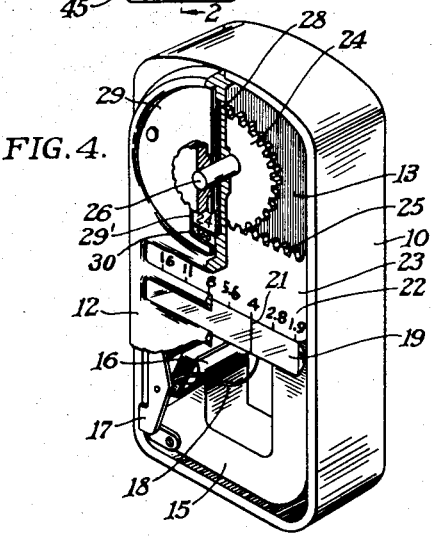
Figure 3:
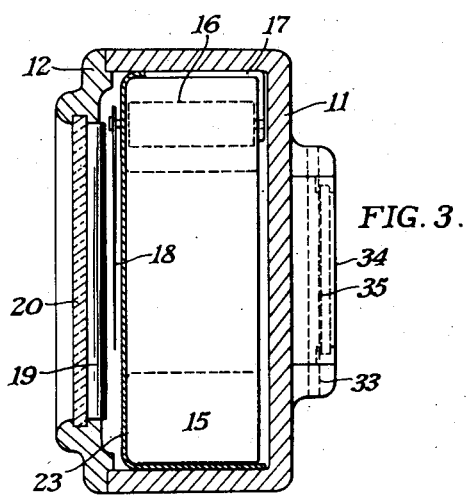

The novel features that I consider characteristic of my invention are set forth with particularity in the appended claim. The invention, itself, however, both as to its organization and methods of operation, together with additional objects and advantages thereof, will best be understood from the following description when read in connection with the accompanying drawings in which:

Fig. 1 is a front elevational view of exposure meter constructed in accordance with a preferred embodiment of the present invention, Fig. 2 is an enlarged vertical section taken substantially on line 2—2 of Fig. 1, Fig. 3 is a horizontal section taken substantially on line 3—3 of Fig. 2, Fig. 4 is a perspective view of the meter with certain parts broken away to show the arrangement and cooperation of the parts, Fig. 5 is a view showing the meter connected to the top of a cine camera so that the diaphragm scale on the camera lens can be viewed from the view finder position of the camera, Fig. 6 is a view showing how the meter will appear to the photographer from the rear, or view finder position, of a camera, and Fig. 7 shows a modification of the meter which uses two mirrors instead of one for directing an image of the diaphragm scale on the camera lens to the view finder position so that the scale numbers appear right side to, and so that different focal length lenses may be accommodated.

Like reference characters refer to corresponding parts throughout the drawing.

Referring now to the drawings, the proposed exposure meter is contained in a plastic casing 10, made up of a body portion forming a front wall 11, and a cover forming a rear wall 12 parallel to and spaced from the front wall. Mounted within this casing is a conventional light-sensitive cell 13 covered by a molded window 14 made from a transparent plastic or glass. Connected to and operated by the light-sensitive cell is a moving coil instrument, or galvanometer, consisting of a magnet 15 and coil 16 which is pivotally mounted in the magnet field by a bracket 17.

To the coil 16 is attached the curved pointer 18 which passes beneath, and at the focal point of, a cylindrical lens 19 cemented to the glass window 20, located in the rear wall of the meter. The image 21 of the pointer 18 from the cylindrical lens reads on the diaphragm stop scale 22 etched on the metal band or tape 23. This tape is wrapped around rollers, not shown, at each side of the casing so that it is free to move back and forth. The tape is positively actuated by gear 24 which meshes with gear teeth 25 cut in the edge of the tape (see Fig. 4).

Gear 24 is fixed to shaft 26 extending through the rear wall of the casing and is turned by knob 27. Fixed rigidly to shaft 26 is the film speed disk 28 with the various emulsion speeds etched on the face thereof. Friction-held to the same shaft is the window disk 29 through the window 29' of which the emulsion speeds on disk 28 and a shutter speed scale 30, molded on the front wall of the casing, can be read. The window disk 29 is provided with a pair of pins P by means of which it can be turned relative to the shaft 26.

One of the main advantages of my exposure meter over the present standard meter is that after the film emulsion speed, and the shutter speed have been set in the window $29^1$ of disk 29, the meter will read directly in diaphragm stop values, due to making the $f$-aperture values equally spaced on the tape 23. The even spacing of the $f$-values is accomplished by the combined use of three different features. First, the pivot point of a coil 16 that carries the pointer 18 is set off to the end of the meter scale nearest the smallest aperture value. Thus, the sensitivity of the device at wide aperture readings is relatively magnified compared to the rest of the scale. This feature is completely disclosed in my U. S. Patent 2,358,083, which issued September 12, 1944, and to which reference can be had for a more complete discussion as to how this particular location of the pivot of the pointer tends to make the response of the meter a substantially linear one.

So locating the pivot of the pointer does not render the movement of the pointer absolutely linear in response to permit equal spacing of the $f$-values on the scale, but leaves slight irregularities which can be tolerated although they are undesirable. These irregularities are further smoothed out by curving the pointer 18 as shown, and using a cylindrical lens 19 for forming an anastigmat image 21 of only a single point thereof. Just how and why a bent pointer moving over a straight, narrow slit, which is what the cylindrical lens 19 provides, will overcome different angular movements of the meter pointer is fully disclosed in my U. S. Patent 2,358,084, which issued September 12, 1944. It will suffice here to say that the bent pointer in combination with the cylindrical lens acts to overcome any irregularities in movement of the pointer not eliminated by the special disposition of the pivot point thereof to the one end of the diaphragm scale, and, hence, the cell response is rendered truly linear so that a diaphragm scale having equally spaced $f$-values can be used.

Mounted in the front wall 11, directly in line with the opening in the center of magnet 15, is a weak positive, or reading, lens 31, which, in combination with window 32 in the rear wall of the casing forms a sight opening through the casing. Pivotally mounted at 33 on the front wall is a cover plate 34, which moves between a lowered position, see Fig. 2, wherein it covers lens 31, and a raised position, see Fig. 5, and dotted line position in Fig. 2. A mirror 35 is fastened to the underside of the cover plate 34. The bottom of the meter is provided with a conventional accessory clip button 45 which is adapted to be slipped into an accessory clip 46 mounted on the top of the combined range and view finder housing H of a cine camera, see Fig. 5. When the meter is so mounted on the camera, and the cover plate 34 is raised a magnified view of the diaphragm scale 36 on the camera lens 37 can be seen from the view finder position and can be paired with the correct value as given by the meter. The diaphragm of the camera lens can, therefore, be readily adjusted in accordance with the meter reading without necessitating removal of the camera from in front of the photographer's eye. In Fig. 6 I have shown how the meter and viewfinder field would appear to the user from the rear of the camera.

The use of a single mirror 35 will cause the numbers of the diaphragm scale and lens to appear in reverse, or 16 will appear as 31, etc. Although such $f$-values are so well known to photographers that their appearance in reverse would probably not be too confusing, it might be well to correct this defect. This can readily be done by the modification shown in Fig. 7 where the single mirror is replaced by a pair of pivoted mirrors $35^1$ and 40. The mirror $35^1$ will now reflect the image of the diaphragm scale on the lens onto the other mirror 40, which will in turn reflect it through the sight opening in the meter casing. This second mirror 40 will reverse the image reflected by and reversed by mirror $35^1$ so that the scale readings as viewed will be right end to. The view shown in the window 32 of Fig. 6 is through this mirror arrangement of Fig. 7. The view shown in the window 32 of Fig. 6 is through this mirror arrangement of Fig. 7. This combination of two mirrors offers the added advantage that lenses of different focal lengths can be accommodated, since by relatively adjusting the mirrors the diaphragm scale of a long focal length lens, which extends a substantial distance from the front wall of the camera, can be reflected through the sight opening in the casing as well as the scale on a short focal length lens, see Fig. 7. The pivots of the mirrors will possess sufficient friction to hold the mirrors in adjusted position, and the mirrors of Fig. 7 are adapted to close in superimposed relation on the front wall of the casing and in covering relation with the lens 31.

The operation of this exposure meter is as follows. Assuming that a shutter speed of 100 and a film speed of 24 is to be used, the window $29^1$ in window disk 29 is set to the shutter speed of 100 by rotating the disk 29, and the film speed 24 is then set in the window $29^1$ by rotating the knob 27 to which is fastened the film speed disk 28. During this last operation the window disk 29 is held from turning by the operator gripping the pins P thereon. In setting the film speed disk 28 gear 24 is rotated to move the tape 23 through the teeth 25 cut in the edge thereof. In this manner the location of the $f$-aperture scale 22 is moved longitudinally relative to the meter pointer.

After the correct setting has been made, the exposure meter is held up so that light from the object to be photographed enters the window 14 and excites the light-sensitive cell 13 which then sends a flow of current to the magnet and creates a magnetic field at gap between the poles of magnet. Since the coil 16 is pivotally suspended in this magnetic field, the field will tend to make the coil rotate, the amount of the rotation depending on the strength of the field. When coil 16 rotates, it carries with it pointer 18 which is so positioned that it passes beneath the lens 19 at its focal point. The image of the point on the pointer is the line 21 which reads on the $f$-aperture scale 22. The pointer is so pivoted with reference to the $f$-aperture scale, and the pointer is bent, so that it translates the response of the cell and the galvanometer into a straight-line relationship, thus making it possible to evenly space the $f$-aperture values on the scale 22 along the tape 23. In other words, if meter response is plotted against the log light intensity the result is a straight line. It is because the pointer is bent that the cylindrical lens 19 is used to form an anastigmatic image of a single point on the pointer which results in the definite line image 21 to read against the scale 22.

If the meter is set as shown in Fig. 6 with a film emulsion speed of 24 and a shutter speed of 100, the correct diaphragm opening is $f/4$ as seen by the position of line 21 relative to the diaphragm scale 22. Supposing that the film was changed to one of an emulsion speed of, say 48. To set this new film speed, window disk 29 is held against movement by gripping pins P and knob 27 is turned counter-clockwise so that number 48 appears in the window $29^1$. The shutter speed setting is still 100. As the knob 27 is turned, gear 24 turns also and moves the tape 23 to the right bringing the $f$-value 5.6 over the image 21 of the pointer, thus making $f/5.6$ the correct diaphragm opening for the existing conditions. These settings are shown in Fig. 1.

Now suppose that it is desirable to change the shutter speed to 50. Again the knob 27 is turned counter-clockwise, and the window disk 29 is allowed to rotate with it. Film speed value stays fixed in the window 29¹ as 48, but the window moves past the stationary shutter speed scale 30 until it uncovers the desired shutter speed 50. As before the gear 24 turns with knob 27 and moves the *f*-aperture tape 23 to the right until the *f*-value 8 is above the pointer image 21. Now the film speed is 48, the shutter speed is 50 and the correct *f*-value is 8. Assuming that the same light intensity exists as did when, at the start, the film speed was 24, the shutter speed 100 and the *f*-aperture was 8, it follows that the last-arrived at *f*-value is correct since doubling the film speed and halving the shutter speed cuts down the diaphragm aperture by two stops.

For use on cine cameras, see Figs. 5, 6, and 7, the meter is mounted on the top of the finder housing H of the camera 39 so that the *f*-aperture scale 36 on the lens 37 can be read from the view finder position. To read the *f*-aperture scale 36 on the lens, the mirror 35 in Fig. 5, or the mirrors 35¹ and 40 in Fig. 7, are raised until the image of the scale 36 on the camera lens is reflected through the weak lens 31 and so through the window 32 to the observer's eye which is at the view finder position. The two aperture scales are now positioned one above the other, see Fig. 6, and can be read at the same time so that the correct diaphragm stop value can be taken from scale 22 and transferred to the lens 37 by rotating the lens diaphragm scale until the correct stop value, the image in window 32, is opposite the image 41 of the index on the *f*-aperture scale on the lens. The *f*-aperture of the camera lens 37 can be properly set without moving the camera from the picture-taking position.

Although I have shown and described certain specific embodiments of my invention, I am fully aware that many modifications thereof are possible. My invention, therefore, is not to be limited to the precise details of construction shown and described, but is intended to cover all modifications coming within the scope of the appended claim.

Having thus described my invention, what I claim is new and desire to secure by Letters Patent of the United States is:

The combination with a photographic camera including a body, a lens mount on the front of said body, a diaphragm scale on said lens mount; of an exposure meter detachably connected to said camera body adjacent the front thereof and to one side of said lens mount; said meter comprising a casing having front and rear walls; a scale extending transversely of the rear wall of said casing and calibrated in values of diaphragm openings; a light-sensitive cell in said casing; a moving-coil instrument in said casing connected to and operated by said cell; and including an annular magnet, the poles and coil of which are disposed to one side of the axis of said magnet; a pointer moved by said coil and cooperating with said scale on the rear wall of the casing; a window in each of said walls of said casing in optical alignment with the opening formed by said magnet, the window in the rear wall being adjacent the scale on said casing; a first mirror pivoted to the front wall of said casing to move between a folded position, wherein it lies against said wall, and a raised position, wherein it is adapted to receive and reflect an image of said diaphragm scale toward said casing; and a second mirror pivoted to the front wall of said casing to move between a folded position, wherein it lies against said wall, and a raised position, wherein it receives the image reflected by said first mirror and in turn reflects it through said windows to the rear of said casing and to a point adjacent the scale on the rear wall thereof, whereby the image of the diaphragm scale on the camera lens mount can be readily compared with the scale on the rear wall of the casing from a point at the rear of the camera.

JOSEPH MIHALYI.

REFERENCES CITED

The following references are of record in the file of this patent:

UNITED STATES PATENTS

| Number | Name | Date |
|---|---|---|
| 1,620,727 | Howell | Mar. 15, 1927 |
| 2,070,664 | Kuppenbender | Feb. 16, 1937 |
| 2,245,522 | Bernhard et al. | June 10, 1941 |
| 2,358,083 | Mihalyi | Sept. 12, 1944 |
| 2,360,256 | Mihalyi | Oct. 10, 1944 |